US012003328B2

(12) United States Patent
Lei et al.

(10) Patent No.: US 12,003,328 B2
(45) Date of Patent: Jun. 4, 2024

(54) METHOD AND APPARATUS FOR HARQ-ACK CODEBOOK REDUCTION

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE); Zhang Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 433 days.

(21) Appl. No.: 17/441,566

(22) PCT Filed: Mar. 29, 2019

(86) PCT No.: PCT/CN2019/080465
§ 371 (c)(1),
(2) Date: Sep. 21, 2021

(87) PCT Pub. No.: WO2020/198952
PCT Pub. Date: Oct. 8, 2020

(65) Prior Publication Data
US 2022/0052790 A1    Feb. 17, 2022

(51) Int. Cl.
*H04L 1/1812*    (2023.01)
*H04L 5/00*    (2006.01)
(Continued)

(52) U.S. Cl.
CPC .......... *H04L 1/1812* (2013.01); *H04L 5/0053* (2013.01); *H04W 72/1268* (2013.01); *H04W 72/23* (2023.01); *H04W 76/28* (2018.02)

(58) Field of Classification Search
CPC ... H04L 1/1812; H04L 5/0053; H04L 1/1607; H04L 1/1671; H04L 1/1822; H04W 72/1268; H04W 72/23; H04W 76/28
See application file for complete search history.

(56) References Cited

U.S. PATENT DOCUMENTS

| 2019/0149271 A1* | 5/2019 | Yin | H04L 1/1607 |
| | | | 370/329 |
| 2019/0150122 A1* | 5/2019 | Ying | H04W 72/23 |
| | | | 370/329 |

(Continued)

FOREIGN PATENT DOCUMENTS

CN    109391381 A    2/2019

OTHER PUBLICATIONS

International Searching Authority, "Written Opinion of the International Searching Authority," PCT/CN2019/080465, dated Dec. 23, 2019, pp. 1-4.

(Continued)

*Primary Examiner* — Dady Chery
(74) *Attorney, Agent, or Firm* — Kunzler Bean & Adamson

(57) ABSTRACT

Embodiments of the present disclosure relate to methods and apparatuses for HARQ-ACK codebook reduction. According to an embodiment of the present disclosure, a method can include: transmitting a plurality of uplink data channels to a BS; and receiving a HARQ-ACK codebook in first DCI indicating downlink feedback. At least one of the plurality of uplink data channels is configured by the BS, and each uplink data channel is associated with each HARQ process. The HARQ-ACK codebook includes at least two sub-codebooks: a first sub-codebook including TB-level HARQ-ACK information bits for a first set of HARQ processes and a second sub-codebook including CBG-level HARQ-ACK information bits for a second set of HARQ processes. The first DCI has the same size with the second DCI for scheduling uplink data transmission. Embodiments of the present disclosure can ensure both UE side and BS side have the same understanding on the reduced HARQ-ACK codebook.

20 Claims, 10 Drawing Sheets

(51) Int. Cl.
    *H04W 72/1268*     (2023.01)
    *H04W 72/23*     (2023.01)
    *H04W 76/28*     (2018.01)

(56) References Cited

U.S. PATENT DOCUMENTS

| | | | |
|---|---|---|---|
| 2019/0379489 A1* | 12/2019 | Hwang | H04L 1/0063 |
| 2021/0258102 A1* | 8/2021 | Yang | H04L 1/1854 |
| 2021/0281458 A1* | 9/2021 | Takeda | H04L 1/1854 |
| 2021/0314100 A1* | 10/2021 | Yeo | H04B 7/0417 |
| 2021/0314102 A1* | 10/2021 | Li | H04L 1/1896 |
| 2021/0344448 A1* | 11/2021 | Nogami | H04L 5/0055 |

OTHER PUBLICATIONS

Wilus Inc., Discussion on HARQ-ACK multiplexing and bundling for NR, 3GPP TSG RAN WG1 Meeting 91, R1-1720876, Nov. 27-Dec. 1, 2017, pp. 1-6, Reno, USA.

Qualcomm Incorporated, Enhancement to configured grants in NR unlicensed, 3GPP TSG RAN WG1 Meeting #94bis, R1-1811255, Oct. 6-Oct. 12, 2018, pp. 1-7, Chengdu, China.

VIVO, Feature lead summary for Configured grant enhancement, 3GPP TSG RAN WG1#96, R1-1903409, Feb. 25-Mar. 1, 2019, Athens, Greece.

* cited by examiner

METHOD AND APPARATUS FOR HARQ-ACK CODEBOOK REDUCTION

TECHNICAL FIELD

Embodiments of the present disclosure generally relate to wireless communication technology, especially to technology for hybrid automatic repeat request acknowledgement (HARQ-ACK) codebook reduction.

BACKGROUND

In 3rd Generation Partnership Project (3GPP) Long Term Evolution (LTE) Rel-15, autonomous uplink (AUL) transmission is supported for unlicensed spectrum. In an AUL transmission, a user equipment (UE) may transmit physical uplink shared channel (PUSCH) on the configured time-frequency resources without waiting for an uplink (UL) grant configured by the base station (BS).

Meanwhile, the UE may determine the hybrid automatic repeat request (HARQ) process identity (ID), new data indicator (NDI), and redundancy version (RV) for the AUL transmission. The UE may also transmit necessary AUL-uplink control information (UCI) information in the associated AUL PUSCH. The AUL-UCI may include 4-bit HARQ process ID, 1-bit or 2-bit NDI, 2-bit RV, 16-bit UE-ID, 1-bit PUSCH starting point indicating symbol 0 or 1, 1-bit PUSCH ending point indicating symbol 12 or 13, 1-bit channel occupy time (COT) sharing indication indicating whether subframe n+X is an applicable subframe for UL to downlink (DL) sharing, and 16-bit cyclic redundancy check (CRC). X is configured by the BS, and 1<X<5.

After receiving an AUL PUSCH from a UE, a BS may transmit HARQ-ACK feedback information to the UE to indicate whether the data on the AUL PUSCH is correctly decoded by the BS. The HARQ-ACK feedback information for a plurality of HARQ processes can be represented as a HARQ-ACK codebook, which can be included in the AUL-downlink feedback information (DFI). The HARQ-ACK codebook in the AUL-DFI is based on HARQ-ACK bitmap for HARQ process IDs associated with scheduled PUSCH and AUL PUSCH. It is reasonable and straightforward for the new radio (NR) access on unlicensed spectrum (NR-U) to reuse HARQ-ACK codebook design in Rel-15 AUL-DFI.

However, only two UL grant formats are defined in Rel-15 NR, i.e., DCI format 0_0 and format 0_1. Both of them cannot provide enough payloads to accommodate code block group (CBG)-level HARQ feedback for all the uplink HARQ processes. Therefore, solutions for reducing the HARQ-ACK feedback overhead are needed to reuse HARQ-ACK codebook design in Rel-15 AUL-DFI.

SUMMARY OF THE APPLICATION

One objective of embodiments of the present disclosure is to provide a technical solution for HARQ-ACK codebook reduction.

According to an embodiment of the present disclosure, a method may include: transmitting a plurality of uplink data channels to a base station, wherein at least one uplink data channel of the plurality of uplink data channels is configured by the base station, wherein each of the plurality of uplink data channels is associated with a HARQ process; and receiving a HARQ-ACK codebook in first DCI indicating downlink feedback, wherein the HARQ-ACK codebook includes at least two sub-codebooks: a first sub-codebook including transport block (TB)-level HARQ-ACK information bits for a first set of HARQ processes and a second sub-codebook including CBG-level HARQ-ACK information bits for a second set of HARQ processes, and the first DCI has the same size as second DCI for scheduling uplink data transmission.

In an embodiment of the present disclosure, the first set of HARQ processes may include all the HARQ processes and the second set of HARQ processes may include first x HARQ processes indicated by "NACK" in the first sub-codebook and x is the largest value satisfying the following equation: $N+x*M+Z<=Y$, wherein M is the maximum number of CBGs per TB, N is a number of all the HARQ processes, Z is the size of other information bits except for the HARQ-ACK codebook in the first DCI, and Y is the size of the second DCI.

In another embodiment of the present disclosure, wherein the first set of HARQ processes includes (N−x) HARQ processes and the second set of HARQ processes includes x HARQ processes, and x is the largest value satisfying the following equation: $x*M+(N-x)+Z<=Y$, wherein M is the maximum number of CBGs per TB, N is a number of all the HARQ processes, Z is the size of other information bits except for HARQ-ACK codebook in the first DCI, and Y is the size of the second DCI.

According to another embodiment of the present disclosure, a method may include: receiving, from a device, a plurality of uplink data channels, wherein at least one uplink data channel of the plurality of uplink data channels is configured to the device, wherein each of the plurality of uplink data channels is associated with a HARQ process; and transmitting, to the device, a HARQ-ACK codebook in first DCI indicating downlink feedback, wherein the HARQ-ACK codebook includes at least two sub-codebooks: a first sub-codebook including TB-level HARQ-ACK information bits for a first set of HARQ processes and a second sub-codebook including CBG-level HARQ-ACK information bits for a second set of HARQ processes, and the first DCI has the same size as second DCI for scheduling uplink data transmission.

According to yet another embodiment of the present disclosure, an apparatus may include: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for HARQ-ACK codebook reduction, which can avoid extra blind detection effort at UE side and ensure both UE side and BS side have the same understanding on the reduced HARQ-ACK codebook. Accordingly, embodiments of the present disclosure can facilitate the implementation of NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP Long Term Evolution (LTE) Release 8 and so on. Persons skilled in the art know very well that, with the development of network architecture and new service scenarios, the embodiments in the present disclosure are also applicable to similar technical problems.

Figure 1:
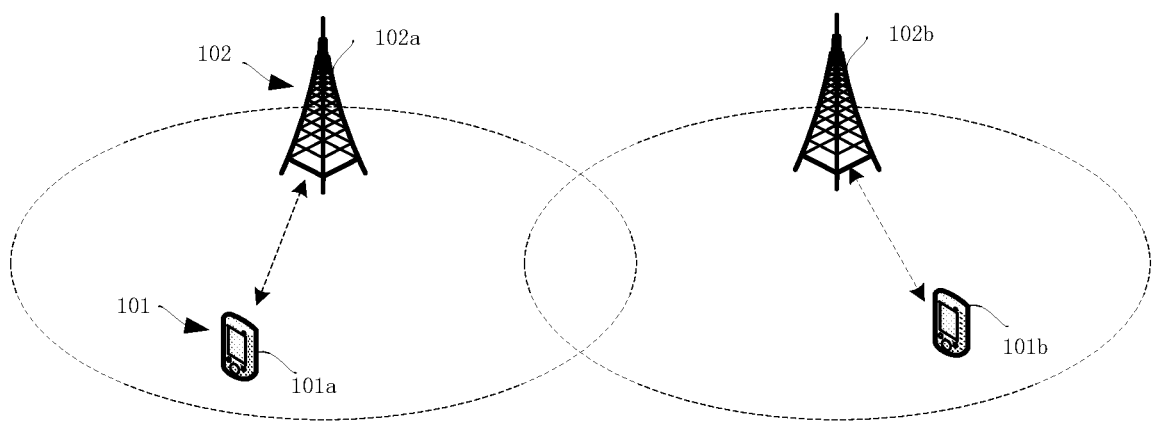
FIG. 1 is a schematic diagram illustrating an exemplary wireless communication system 100 according to an embodiment of the present disclosure.

FIG. 1 is a schematic diagram illustrating an exemplary wireless communication system 100 according to an embodiment of the present disclosure.

As shown in FIG. 1, the wireless communication system 100 includes at least one user equipment (UE) 101 and at least one base station (BS) 102. In particular, the wireless communication system 100 includes two UEs 101, e.g., the first UE 101a and the second UE 101b and two BSs 102, e.g., the first BS 102a and the second BS 102b for illustrative purpose. Although a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments of the present disclosure, each of the BSs 102 may also be referred to as an access point, an access terminal, a base, a macro cell, a Node-B, an evolved Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In an embodiment of the present disclosure, the wireless communication system 100 is compatible with the 5G new radio of the 3GPP protocol, wherein the BSs 102 transmit data using an orthogonal frequency division multiplexing (OFDM) modulation scheme on the downlink (DL) and the UEs 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In another embodiment of the present disclosure, the BSs 102 may communicate using other communication protocols, such as the IEEE 802.11 family of wireless communication protocols. Further, in some embodiments of the present disclosure, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In yet another embodiment of present disclosure, the BSs 102 may communicate with the UEs 101 using the 3GPP 5G protocols.

During study item phase of the new radio (NR) access on unlicensed spectrum (NR-U), radio access network work group 1 (RAN1) has agreed to introduce DFI including HARQ-ACK feedback information for the configured grant PUSCH transmission, and UE may perform non-adaptive PUSCH retransmission for the configured grant PUSCH transmission if the corresponding HARQ-ACK feedback information in the DFI indicates "NACK". Moreover, according to the agreement in RAN1 #96 meeting, if UE does not receive "ACK" before the expiration of the configured grant timer, UE assumes "NACK" for the configured grant PUSCH transmission.

Regarding how to perform the PUSCH retransmission, a TB-based retransmission is supported in NR for hybrid automatic repeat request acknowledgement (HARQ-ACK) feedback. For the TB-based retransmission, one HARQ-ACK feedback bit corresponds to one TB. As long as one CB of a given TB is not correctly decoded at the receiver side, the receiver side will report a "Non-Acknowledgement (NACK)" for the given TB to the transmitter side, and the transmitter side has to retransmit all the CBs of the given TB.

However, considering the wideband unlicensed spectrum, one PUSCH may be scheduled to occupy more than one subband of 20 MHz. Since listen before talk (LBT) or sometimes listen before transmit (LBT) is performed in the unit of subband, one PUSCH may be transmitted in some of the scheduled subbands if the LBT result for subband is successful and be punctured in other subbands with the failed LBT. In this sense, the code block group (CBG)-based retransmission can be used to schedule the punctured data in retransmission. In detail, those CBGs of the PUSCH which have been punctured due to LBT failure or incorrectly decoded by a BS can be scheduled for retransmission by means of indicating the corresponding code block group transmission information (CBGTI) in the UL grant scheduling retransmission. In contrast, those CBGs of the PUSCH which have been transmitted and correctly decoded by BS are not necessary for retransmission. So the corresponding CBGTI in the UL grant scheduling retransmission indicates no need to retransmit those CBGs.

Basically, the intention of CBG is to group several code blocks (CBs) into one CBG so that HARQ-ACK feedback can be generated per CBG. Only all the CBs within one CBG are correctly decoded, the receiver side may send "ACK" for the CBG to the transmitter side. Otherwise, the receiver side may send "NACK" for the CBG to the transmitter side. After receiving the HARQ-ACK feedback, the transmitter side can only retransmit the CBG(s) with "NACK".

For the CBG-based retransmission, the maximum number of CBGs per TB may be configured by a radio resource control (RRC) signalling. For example, the maximum number of CBGs per TB may be 2, 4, 6 and 8. For both semi-static HARQ-ACK codebook and dynamic HARQ-ACK codebook, the number of HARQ-ACK bits for one TB is equal to the configured maximum number of CBGs per TB, regardless of the variable TBS (transport block size) of a given TB. For NR DL transmission, a maximum of 16 DL HARQ processes per cell is supported by UE. The number of DL HARQ processes is configured to the UE for each cell separately by higher layer parameter nrofHARQ-processes-ForPDSCH. When no configuration is provided, the UE may assume a default number of 8 DL HARQ processes. For NR uplink, 16 HARQ processes per cell are supported by the UE.

The HARQ-ACK codebook in the DFI needs to support CBG level HARQ-ACK feedback information. However, mapping CBG-level HARQ-ACK bits for all the uplink HARQ processes leads to a huge HARQ-ACK codebook. For example, in the case that the maximum number of CBGs per TB is configured to 8 and there are 16 HARQ processes in UL, the HARQ-ACK codebook size in DFI is equal to 16*8=128 bits. Besides the HARQ-ACK codebook, the DFI may also include other necessary information, which may include 0 or 3-bit Carrier Indicator Field (CIF), 1-bit AUL DFI flag to differentiate from DCI for AUL activation/deactivation, 2-bit transmit power control (TPC) for PUSCH, 3-bit or 6-bit transmitted precoding matrix indicator (TPMI), and so on. Given this, the total payload size of the DFI may be up to 140 bits.

Under such circumstance, introducing a new DCI format for the DFI will cause inevitably higher UE blind detection effort. To avoid extra blind decoding complexity, the DFI can be designed to have the same size as one of existing UL grant formats, for example, DCI format 0_0 and format 0_1. Since both of them do not have enough payload to accommodate CBG-level HARQ feedback for all the uplink HARQ processes, the HARQ-ACK feedback overhead have to be reduced.

Embodiments of the present disclosure provide solutions to solve the aforementioned issues of HARQ-ACK codebook reduction such that the DFI may match the payload size of DCI format 0_0 or format 0_1. Embodiments of the present disclosure can avoid extra blind detection effort at UE side, and ensure both the UE side and BS side have the same understanding on the reduced HARQ-ACK codebook.

More details on the embodiments of the present disclosure will be illustrated in the following text in combination with the appended drawings.

Figure 2:
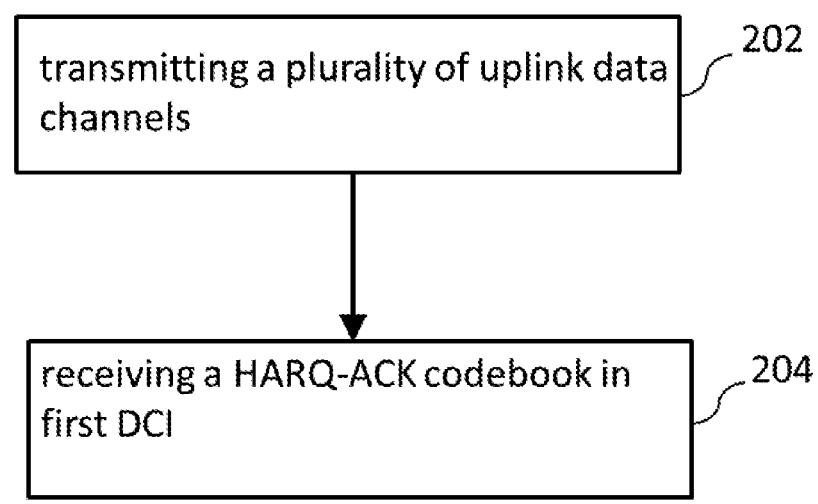
FIG. 2 is a flow chart illustrating a method for HARQ-ACK codebook reduction according to an embodiment of the present disclosure.

FIG. 2 is a flow chart illustrating a method for HARQ-ACK codebook reduction according to an embodiment of the present disclosure. The method may be implemented by a UE 101, for example, the first UE 101a or the second UE 101b as shown in FIG. 1.

As shown in FIG. 2, in step 202, the UE 101 may transmit a plurality of uplink data channels to a BS 102. The uplink data channel may be a PUSCH. One or two TBs can be transmitted on each uplink data channel, and each of the plurality of uplink data channels can be associated with a HARQ process. The plurality of uplink data channels may include at least one uplink data channel configured by the BS 102, for example, via a radio resource control (RRC) signaling. In an embodiment of the present disclosure, all of the plurality of uplink data channels may be configured by the BS 102. In another embodiment of the present disclosure, the plurality of uplink data channels may include at least one uplink data channel scheduled by the BS 102, for example, via DCI. For the at least one configured uplink data channel, DCI may be needed for activation and deactivation of the transmission on the at least one configured uplink data channel.

After transmitting the plurality of uplink data channels, in step 204, the UE 101 may receive a HARQ-ACK codebook in first DCI indicating downlink feedback. The HARQ-ACK codebook may include at least two sub-codebooks: a first sub-codebook including TB-level HARQ-ACK information bits for a first set of HARQ processes and a second sub-codebook including CBG-level HARQ-ACK information bits for a second set of HARQ processes. The first DCI has the same size as second DCI for scheduling uplink data transmission of the UE 101. The size of the second DCI may refer to the payload size of the second DCI. For example, the second DCI may be a DCI format 0_0 or DCI format_1 defined in NR Rel-15. The payload size of DCI format 0_1 is dependent on the concrete RRC configuration since most fields in DCI format 0_1 are configurable. The payload size of DCI format 0_0 is dependent on the bandwidth of the current active bandwidth part (BWP) or initial BWP and the size of DCI format 1_0 since the DCI format 0_0 and the DCI format 1_0 should always have same payload size. The first DCI and the second DCI may be scrambled with two different radio network temporary identities (RNTIs).

According to an embodiment of the present disclosure, one TB-level HARQ-ACK information bit corresponds to one TB. As long as one CB of a given TB is not correctly decoded at the BS 102, the BS 102 may generate a "NACK" for the given TB to the UE 101, and the UE 101 may retransmit all the CBs of the given TB. In the case that all CBs of a given TB are correctly decoded at the BS 102, the BS 102 may report an "ACK" for the given TB to the UE 101.

The TB-level HARQ-ACK information bit may have a value "0" or "1." For example, the value "0" may indicate an "ACK" for the given TB and the value "1" may indicate a "NACK" for the given TB. In another example, the value "1" may indicate an "ACK" for the given TB and the value "0" may indicate a "NACK" for the given TB.

According to another embodiment of the present disclosure, one CBG-level HARQ-ACK information bit corresponds to one CBG. As long as one CB of a given CBG is not correctly decoded at the BS 102, the BS 102 may generate a "NACK" for the given CBG to the UE 101, and the UE 101 may retransmit all the CBs of the given CBG. In the case that all CBs of a given CBG are correctly decoded at the BS 102, the BS 102 may report an "ACK" for the given CBG to the UE 101.

The CBG-level HARQ-ACK information bit may have a value "0" or "1." For example, the value "0" may indicate an "ACK" for the given CBG and the value "1" may indicate a "NACK" for the given CBG. In another example, the value "1" may indicate an "ACK" for the given CBG and the value "0" may indicate a "NACK" for the given CBG.

The first set of HARQ processes and the second set of HARQ processes may be determined based on all the uplink HARQ processes. In an embodiment of the present disclosure, the number of all the uplink HARQ processes may be N, wherein N is an integer lager than one. The number N may be the maximum number of HARQ processes configured by a BS 102 or may be predefined value or a fixed value, for example, N=16 in 3GPP standard TS38.214.

Embodiments I

According to some embodiments of the present disclosure, all the HARQ processes may be indicated by TB-level HARQ-ACK information bits in the first sub-codebook firstly, and then the first x HARQ processes indicated by "NACK" in the first sub-codebook may be indicated by CBG-level HARQ-ACK information bits in the second sub-codebook, wherein x is the largest value satisfying the following equation:

$$N+x*M+Z<=Y \qquad (1)$$

wherein M is the maximum number of CBGs per TB, N is a number of all the HARQ processes, Z is the size of other information bits except for the HARQ-ACK codebook in the first DCI, and Y is the size of the second DCI. The other information may include at least one of the followings: CIF, AUL DFI flag to differentiate from DCI for AUL activation/deactivation, TPC for PUSCH, TPMI, and so on. In this case, the first set of HARQ processes may include all the HARQ processes and the second set of HARQ processes may include the first x HARQ processes indicated by "NACK" in the first sub-codebook. The first sub-codebook may include N bits and the second sub-codebook may include x*M bits.

In an embodiment of the present disclosure, the HARQ-ACK codebook and the other information may be included in the first DCI. One or more padding bits may be needed if the size of the first DCI is smaller than the size of the second DCI. Specifically, in the case that the size of the first DCI is equal to the size of the second DCI, i.e., N+x*M+Z=Y, no padding bit is needed for the first DCI. In the case that the size of the first DCI is smaller than the size of the second DCI, i.e., N+x*M+Z<Y, then Y−(N+x*M+Z) padding bits may be needed for the first DCI so that the first DCI may have the same size as the second DCI. "NACK" bit may be used as the padding bit and appended in the HARQ-ACK codebook. Alternatively, zero bit may be used as the padding bit and appended in the first DCI.

For example, assuming that M=8, N=16, Y=84, and Z=3, according to equation (1), it can be determined that 16+8*8+3=83<84. Therefore, x=8 and 1 bit is padded at the end of the HARQ-ACK codebook.

In another embodiment of the present disclosure, it is noted that the first DCI may use the first CRC (e.g., 16-bit CRC) with different bit length from the second CRC (e.g., 24-bit CRC) used for the second DCI. In this case, the size Y may be extended from equation (1) to include the difference between the bit lengths of the above two CRCs such that the right side of equation (1) can be changed to "Y+length(second DCI-second CRC)−length(first DCI-first CRC)." Accordingly, the following two equations can be achieved:

$$N+x*M+Z<=Y+\text{length(second DCI-second CRC)}-\text{length(first DCI-first CRC)} \qquad (2)$$

$$N+x*M+Z+\text{length(first DCI-first CRC)}<=Y+\text{length(second DCI-second CRC)} \qquad (3)$$

In yet another embodiment of the present disclosure, spatial bundling may be configured via RRC signaling. Alternatively, spatial bundling may be adopted implicitly in the case the HARQ-ACK codebook size in first DCI is larger than a predefined value or the payload size of the second DCI. In the case that the spatial bundling is configured or implicitly adopted, each HARQ process may be indicated with one TB-level HARQ-ACK information bit even if the HARQ process is associated with an uplink data channel carrying more than one TB. In the case that spatial bundling is not configured or not implicitly adopted, each HARQ process may be indicated with two TB-level HARQ-ACK information bits when the HARQ process is associated with an uplink data channel carrying two TBs. In this case, equation (1) may be changed to read the following:

$$2*N+2*x*M+Z<=Y \qquad (4)$$

Generally, the spatial bundling or number of TBs carried by an uplink data channel may be different from one slot to another slot, or from one HARQ process to another HARQ process. Consequently, for each slot or HARQ process where spatial bundling is configured, 1-bit TB-level HARQ-ACK information and M-bit CBG-level HARQ-ACK information may be counted when determining the value of x. For each slot or HARQ process where spatial bundling is not configured and there are n0 TBs associated with each HARQ process, n0 TB-level HARQ-ACK bits and n0*x*M CBG-level HARQ-ACK bits are counted when determining the value of x. n0 is an integer equal to or larger than one. For example, n0=2 in the case that there are two TBs in a PUSCH without spatial bundling. Accordingly, equation (1) may be changed to read the following:

$$n0*N+n0*x*M+Z<=Y \quad (5)$$

Figure 3:
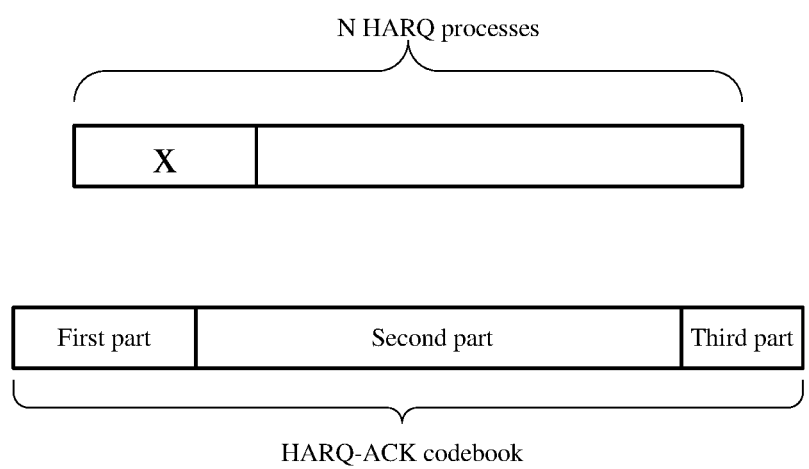
FIG. 3 is a schematic diagram illustrating one construction of the HARQ-ACK codebook according to an embodiment of the present disclosure.

The HARQ-ACK codebook in the above illustrated embodiments associated with equations (1)-(5) may have several constructions according to some embodiments of the present disclosure. FIG. 3 is a schematic diagram illustrating one construction of the HARQ-ACK codebook according to an embodiment of the present disclosure.

The HARQ-ACK codebook shown in FIG. 3 may include two or three parts. Specifically, the first part is for the TB-level HARQ-ACK information bits for all the HARQ processes, i.e., the first sub-codebook, and is placed at the beginning of the HARQ-ACK codebook. Placing the first sub-codebook at the beginning has an advantage that the position and length of the first sub-codebook does not depend on the transmitted payloads of other fields, so that the start and end point of this part is completely known at the base station and the UE side from the RRC configuration. The second part is for the CBG-level HARQ-ACK information bits for the first x HARQ processes indicated by "NACK" in the first sub-codebook, i.e., the second sub-codebook, and is placed subsequently to the first part. The third part can be formed to match the size of the first DCI with the size of the second DCI format if any padding bit is necessary. Accordingly, the third part is for at least one padding bit in the case there are still available payload(s) in the HARQ-ACK codebook besides those for the first and second sub-codebook. The third part is placed at the end of the HARQ-ACK codebook in the embodiment shown in FIG. 3.

However, the order of the above two or three parts can be changed in different embodiments of the present disclosure. For example, the third part may be at the beginning of the HARQ-ACK codebook, then the first part may follow the third part, and then the second part may follow the first part of the HARQ-ACK codebook.

According to another embodiment of the present disclosure, the HARQ processes may include the HARQ processes in at least one reference slot used for determining a contention window size (CWS) for uplink channel access procedure. The contention window is applied in LBT Category 4, and is also named Type 1 channel access procedure in 3GPP Rel-14 and beyond, where a random backoff counter is generated within the contention window. A contention window corresponds to a priority class. An example on channel access priority class and corresponding contention window are listed in Table 1. The contention window size at the transmitter side is adjusted based on HARQ-ACK feedback from the receiver side. For example, if at least 80% of the HARQ-ACK feedback values for a reference slot set are NACK, the contention window size is doubled. Otherwise, the contention window size is reset to the minimum value.

TABLE 1

Channel Access Priority Class for UL

| Channel Access Priority Class (p) | $m_p$ | $CW_{min,p}$ | $CW_{max,p}$ | $T_{ulmcot,p}$ | allowed $CW_P$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or | {15, 31, 63, 127, 255, 511, |

TABLE 1-continued

Channel Access Priority Class for UL

| Channel Access Priority Class (p) | $m_p$ | $CW_{min,p}$ | $CW_{max,p}$ | $T_{ulmcot,p}$ | allowed $CW_P$ sizes |
|---|---|---|---|---|---|
| | | | | 10 ms | 1023} |
| 4 | 7 | 15 | 1023 | 6 ms or 10 ms | {15, 31, 63, 127, 255, 511, 1023} |

NOTE 1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

In the case that all HARQ processes transmitted in the at least one reference slot are indicated by "ACK" in the first sub-codebook. The construction of the HARQ-ACK codebook may be the same as those in FIG. 3.

Figure 4:
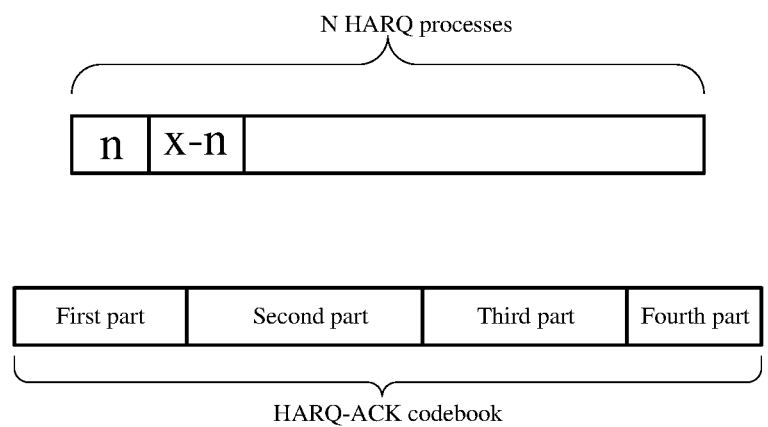
FIG. 4 is a schematic diagram illustrating another construction of the HARQ-ACK codebook according to another embodiment of the present disclosure.

However, in the case that n HARQ processes transmitted in the at least one reference slot are indicated by "NACK" in the first sub-codebook, then the HARQ-ACK codebook may include three or four parts as shown in FIG. 4, wherein n is an integer larger than 0.

Specifically, FIG. 4 is a schematic diagram illustrating another construction of the HARQ-ACK codebook according to another embodiment of the present disclosure. In FIG. 4, the TB-level HARQ-ACK information bits for all the HARQ processes, i.e., the first sub-codebook are placed at the beginning, and form the first part of the HARQ-ACK codebook. The CBG-level HARQ-ACK information bits for the n HARQ processes indicated by "NACK" in the first sub-codebook are placed subsequently to the first part, and form the second part of the HARQ-ACK codebook. The CBG-level HARQ-ACK information bits for the first or last (x-n) HARQ processes transmitted in other slots than the reference slot(s) and indicated by "NACK" in the first sub-codebook are placed subsequently to the second part, and form the third part of the HARQ-ACK codebook. The fourth part can be formed to match the size of the first DCI with the size of the second DCI format if any padding bit is necessary. Accordingly, the fourth part is for at least one padding bit in the case there are still available payload(s) in the HARQ-ACK codebook besides those for the first, second and three parts. The fourth part is placed at the end of the HARQ-ACK codebook in the embodiment shown in FIG. 4. Similarly, the order of the above three or four parts may be changed.

Embodiments II

According to some embodiments of the present disclosure, (N-x) HARQ processes may be indicated by TB-level HARQ-ACK information bits in the first sub-codebook, and x HARQ processes may be indicated by CBG-level HARQ-ACK information bits in the second sub-codebook. In an embodiment of the present disclosure, the x HARQ processes may be the first or last x HARQ processes of all the HARQ processes. In this case, the first set of HARQ processes may include last or first (N-x) HARQ processes and the second set of HARQ processes may include first or last x HARQ processes and x is the largest value satisfying the following equation:

$$x*M+(N-x)+Z<=Y \quad (6)$$

The above equation (6) may be changed to:

$$x*(M-1)+N+Z<=Y \quad (7)$$

wherein M is the maximum number of CBGs per TB, N is a number of all the HARQ processes, Z is the size of other information bits except for the HARQ-ACK codebook in the first DCI, and Y is the size of the second DCI. The other information may include at least one of the followings: CIF, AUL DFI flag to differentiate from DCI for AUL activation/deactivation, TPC for PUSCH, TPMI, and so on. The first sub-codebook may include (N−x) bits and the second sub-codebook may include x*M bits.

In an embodiment of the present disclosure, the HARQ-ACK codebook and the other information may be included in the first DCI. One or more padding bits may be needed if the size of the first DCI is smaller than the size of the second DCI. Specifically, in the case that the size of the first DCI is equal to the size of the second DCI, i.e., x*M+(N−x)+Z=Y, no padding bit is needed for the first DCI. In the case that the size of the first DCI is smaller than the size of the second DCI, i.e., x*M+(N−x)+Z<Y, then Y−(x*M+N−x+Z) padding bits may be needed for the first DCI so that the first DCI can have the same size as the second DCI. "NACK" bit may be used as the padding bit and appended in the HARQ-ACK codebook. Alternatively, zero bit may be used as the padding bit and appended in the first DCI.

For example, assuming that M=8, N=16, Y=84, Z=3, according to equation (7), it can be determined that 9*(8−1)+16+3=82<84. Thus, x=9, and 2 bits are padded at the end of the HARQ-ACK codebook.

In another embodiment of the present disclosure, the first DCI may use the first CRC (e.g., 16-bit CRC) with a bit length different from the second CRC (e.g., 24-bit CRC) used for the second DCI. In this case, the size Y may be extended from equation (6) to include the difference between the bit lengths of the above two CRCs so that the right side of equation (6) is "Y+length(second DCI-second CRC)−length(first DCI-first CRC)". Accordingly, the following two equations can be achieved:

$$x*M+(N-x)+Z<=Y+\text{length(second DCI-second CRC)}-\text{length(first DCI-first CRC)} \quad (8)$$

$$x*M+(N-x)+Z+\text{length(first DCI-first CRC)}<=Y+\text{length(second DCI-second CRC)} \quad (9)$$

In yet another embodiment of the present disclosure, spatial bundling may be configured via RRC signaling. Alternatively, spatial bundling may be adopted implicitly in the case the HARQ-ACK codebook size in first DCI is larger than a predefined value or the payload size of the second DCI. In the case that the spatial bundling is configured or implicitly adopted, each HARQ process may be indicated with one TB-level HARQ-ACK information bit even if the HARQ process is associated with an uplink data channel carrying more than one TB. In the case that spatial bundling is not configured or not implicitly adopted, each HARQ process may be indicated with two TB-level HARQ-ACK information bits when the HARQ process is associated with an uplink data channel carrying two TBs. In this case, equation (6) may be changed to read the following:

$$2*x*M+2*(N-x)+Z<=Y \quad (10)$$

Generally, the spatial bundling or number of TBs carried by an uplink data channel may be different from one slot to another slot, or from one HARQ process to another HARQ process. Consequently, for each slot or HARQ process where spatial bundling is configured, 1-bit TB-level HARQ-ACK and M-bit CBG-level HARQ-ACK may be counted when determining the value of x. For each slot or HARQ process where spatial bundling is not configured and there are n0 TBs associated with each HARQ process, n0 TB-level HARQ-ACK bits and n0*x*M CBG-level HARQ-ACK bits are counted when determining the value of x. n0 is an integer equal to or larger than one. For example, n0=2 in the case that there are two TBs in a PUSCH without spatial bundling. Accordingly, equation (6) may be changed to read the following:

$$n0*x*M+n0*(N-x)+Z<=Y \quad (11)$$

Figure 5:
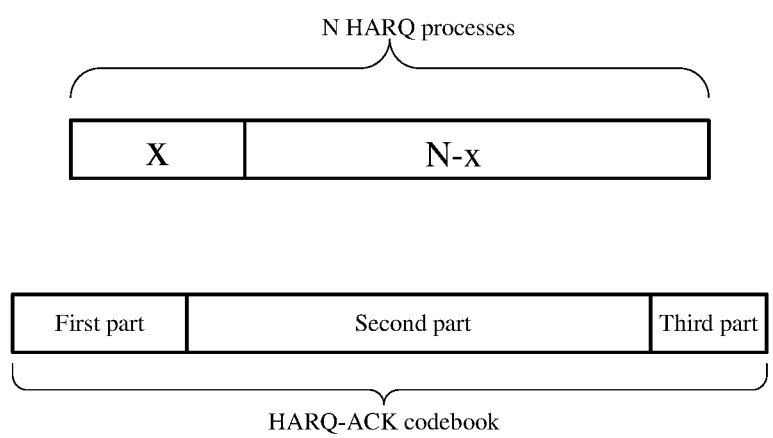
FIG. 5 is a schematic diagram illustrating yet another construction of the HARQ-ACK codebook according to another embodiment of the present disclosure.

The HARQ-ACK codebook in the above illustrated embodiments associated with equations (6)-(11) may have several constructions according to some embodiments of the present disclosure. FIG. 5 is a schematic diagram illustrating another construction of the HARQ-ACK codebook according to yet another embodiment of the present disclosure.

The HARQ-ACK codebook shown in FIG. 5 may include two or three parts. Specifically, the TB-level HARQ-ACK information bits for (N−x) the HARQ processes (i.e., the first sub-codebook) are placed at the beginning, and forms the first part of the HARQ-ACK codebook. The CBG-level HARQ-ACK information bits (i.e., the second sub-codebook) for the x HARQ processes (e.g., the first or last x HARQ processes of all the HARQ processes) are placed subsequently to the first part, and form the second part of the HARQ-ACK codebook. The third part is formed to match the size of the first DCI with the size of the second DCI format if any padding bit is necessary. Accordingly, the third part is formed at least one padding bit placed at the end of the HARQ-ACK codebook in FIG. 5 in the case that there are still available payload(s) in the HARQ-ACK codebook besides those for the first and second sub-codebook.

However, the order of the above two or three parts may be changed in different embodiments of the present disclosure. For example, the third part may be at the beginning of the HARQ-ACK codebook, the first part may be placed subsequently to the third part, and the second part may be placed subsequently to the first part of the HARQ-ACK codebook.

All the HARQ processes may include the HARQ processes in at least one reference slot used for determining a contention window size for uplink channel access procedure. In an embodiment of the present disclosure, in the case that all the HARQ processes transmitted in the at least one reference slot are included in the x HARQ processes, the construction of the HARQ-ACK codebook may be the same as that in FIG. 5. In another embodiment of the present disclosure, in the case that all the HARQ processes transmitted in the at least one reference slot are included in the (N−x) HARQ processes and are indicated by "ACK" in the first sub-codebook, the construction of the HARQ-ACK codebook may be the same as that in FIG. 5.

Figure 6:
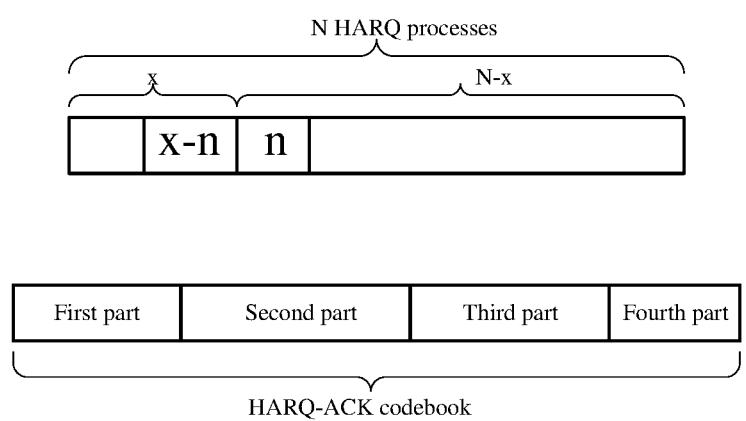
FIG. 6 is a schematic diagram illustrating yet another construction of the HARQ-ACK codebook according to another embodiment of the present disclosure.

In yet another embodiment of the present disclosure, in the case that n HARQ processes transmitted in the at least one reference slot are included in the (N−x) HARQ processes and indicated by "NACK" in the first sub-codebook, the HARQ-ACK codebook may include three or four parts as shown in FIG. 6, wherein n is integer larger than 0.

Specifically, FIG. 6 is a schematic diagram illustrating another construction of the HARQ-ACK codebook according to yet another embodiment of the present disclosure. In FIG. 6, the TB-level HARQ-ACK information bits for (N−x) HARQ processes (i.e., the first sub-codebook) are placed at the beginning, i.e., the first part of the HARQ-ACK codebook, the CBG-level HARQ-ACK information bits for the n HARQ processes indicated by "NACK" in the first sub-codebook are placed in the second part of the HARQ- ACK codebook, i.e., following the first part; the CBG-level HARQ-ACK information bits for the (x−n) HARQ processes transmitted in other slots than the reference slot(s) are placed in the third part of the HARQ-ACK codebook, i.e., following the second part; at least one padding bit are placed at the end, i.e., the fourth part of the HARQ-ACK codebook in the case that at least one padding bits are needed to match the payload size of the first DCI to the size of the second DCI format. In an embodiment of the present disclosure, the CBG-level HARQ-ACK information bits for the first (x−n) HARQ processes of the x HARQ processes (e.g., the first or last x HARQ processes of all the HARQ processes) are placed in the third part of the HARQ-ACK codebook. In another embodiment, the CBG-level HARQ-ACK information bits for the last (x−n) HARQ processes of the x HARQ processes (e.g., the first or last x HARQ processes of all the HARQ processes) are placed in the third part of the HARQ-ACK codebook. Similarly, the order of the above three or four parts may be changed.

In yet another embodiment, in the case that not all the HARQ processes transmitted in the reference slots are included in the first x HARQ processes, e.g., the first n1 HARQ processes transmitted in the reference slots are included in the first x HARQ processes and the last n2 HARQ processes transmitted in the reference slots are included in the last N−x HARQ processes, and all the last n2 HARQ processes in the reference slots are indicated by "ACK" in the first sub-codebook, then the construction of the HARQ-ACK codebook may be the same as that in FIG. 5, wherein n1 and n2 are integer lager than 0.

Figure 7:
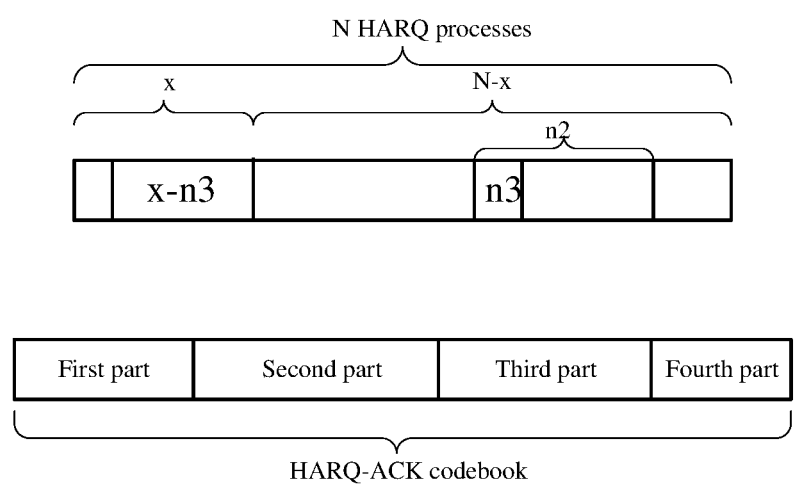
FIG. 7 is a schematic diagram illustrating yet another construction of the HARQ-ACK codebook according to another embodiment of the present disclosure.

In yet another embodiment, in the case that not all the HARQ processes transmitted in the reference slots are included in the first x HARQ processes, e.g., the first n1 HARQ processes transmitted in the reference slots are included in the first x HARQ processes and the last n2 HARQ processes transmitted in the reference slots are included in the last N−x HARQ processes, and there are n3 HARQ processes of the last n2 HARQ processes in the reference slots are indicated by "NACK" in the first sub-codebook, then the HARQ-ACK codebook may include three or four parts as shown in FIG. 7, wherein n1, n2, and n3 are integer larger than 0.

Specifically, FIG. 7 is a schematic diagram illustrating another construction of the HARQ-ACK codebook according to yet another embodiment of the present disclosure. In FIG. 7, the TB-level HARQ-ACK information bits for (N−x) HARQ processes (i.e., the first sub-codebook) are placed at the beginning, and form the first part of the HARQ-ACK codebook. The CBG-level HARQ-ACK information bits for the n3 HARQ processes indicated by "NACK" in the first sub-codebook are placed subsequently to the first part, and form the second part of the HARQ-ACK codebook. The CBG-level HARQ-ACK information bits for the (x−n3) HARQ processes transmitted in other slots than the reference slot(s) are placed subsequently to the second part, and form the third part of the HARQ-ACK codebook. The fourth part can be formed to match the size of the first DCI with the size of the second DCI format if any padding bit is necessary. Accordingly, the fourth part is for at least one padding bit in the case there are still available payload(s) in the HARQ-ACK codebook besides those for the first, second and three parts. The fourth part is placed at the end of the HARQ-ACK codebook in the embodiment shown in FIG. 7. Similarly, the order of the above three or four parts may be changed. In an embodiment of the present disclosure, the CBG-level HARQ-ACK information bits for the first (x−n3) HARQ processes of the x HARQ processes (e.g., the first or last x HARQ processes of all the HARQ processes) transmitted in other slots than the reference slot(s) are placed in the third part of the HARQ-ACK codebook. In another embodiment of the present disclosure, the CBG-level HARQ-ACK information bits for the last (x−n3) HARQ processes of the x HARQ processes (e.g., the first or last x HARQ processes of all the HARQ processes) transmitted in other slots than the reference slot(s) are placed in the third part of the HARQ-ACK codebook.

Embodiments III

According to some embodiments of the present disclosure, all the HARQ processes may be firstly indicated by TB-level HARQ-ACK information bits in the first sub-codebook, and the first x HARQ processes indicated by "NACK" in the first sub-codebook may be indicated by CBG-level HARQ-ACK information bits in the second sub-codebook. In this case, the first set of HARQ processes may include all the HARQ processes and the second set of HARQ processes may include first x HARQ processes indicated by "NACK". The value of the x may be configured via RRC signaling and may be one of 0, 1, 2, 3, 4, 5, 6, 7, 8, 9, 10, 11, 12, 13, 14, 15, 16 and so on. One or more padding bits may be needed if the size of the first DCI is smaller than the size of the second DCI. "NACK" bit may be used as the padding bit and appended in the HARQ-ACK codebook. Alternatively, zero bit may be used as the padding bit and appended in the first DCI.

In an embodiment of the present disclosure, the first DCI may use the first CRC (e.g., 16-bit CRC) with a bit length different from the second CRC (e.g., 24-bit CRC) used for the second DCI. In this case, the size of the first DCI and the second DCI may also include the corresponding CRC bits besides the information bits.

In another embodiment of the present disclosure, spatial bundling may be configured via RRC signaling or implicitly adopted. In the case that the spatial bundling is configured or implicitly adopted, 1-bit TB-level HARQ-ACK and M-bit CBG-level HARQ-ACK may be used to indicate one HARQ process. In the case that the spatial bundling is not configured or not implicitly adopted, n0 TB-level HARQ-ACK bit and n0*M CBG-level HARQ-ACK bits may be used to indicate one HARQ process, wherein n0 is an integer equal to or larger than one. For example, n0=2 in the case that there are two TBs in a PUSCH without spatial bundling.

In Embodiments III, the constructions of the HARQ-ACK codebook may be the same as those in FIGS. 3 and 4.

Embodiments IV

According to some embodiments of the present disclosure, (N−x) HARQ processes may be indicated by TB-level HARQ-ACK information bits in the first sub-codebook, and x HARQ processes may be indicated by CBG-level HARQ-ACK information bits in the second sub-codebook. In an embodiment of the present disclosure, the x HARQ processes may be the first x HARQ processes of all the HARQ processes. In this case, the first set of HARQ processes may include last (N−x) HARQ processes and the second set of HARQ processes may include first x HARQ processes, wherein N is the number of all the HARQ processes. The value of the x may be configured via RRC signaling and may be one of 0, 1, 2, 3, 4, 5, 6, 7, 8, 9, 10, 11, 12, 13, 14, 15, 16 and so on. One or more padding bits may be needed if the size of the first DCI is smaller than the size of the second DCI. "NACK" bit may be used as the padding bit and appended in the HARQ-ACK codebook.

Alternatively, zero bit may be used as the padding bit and appended in the first DCI. In another embodiment of the present disclosure, the x HARQ processes may be the last x HARQ processes of all the HARQ processes. In this case, the first set of HARQ processes may include first (N−x) HARQ processes and the second set of HARQ processes may include last x HARQ processes, wherein N is the number of all the HARQ processes.

In an embodiment of the present disclosure, it is noted that the first DCI may use the first CRC (e.g., 16-bit CRC) with a bit length different from the second CRC (e.g., 24-bit CRC) used for the second DCI. In this case, the size of the first DCI and the second DCI may also include the corresponding CRC bits besides the information bits.

In another embodiment of the present disclosure, spatial bundling may be configured via RRC signaling or implicitly adopted. In the case that the spatial bundling is configured or implicitly adopted, one TB-level HARQ-ACK bit and M CBG-level HARQ-ACK bits may be used to indicate one HARQ process. In the case that the spatial bundling is not configured or not implicitly adopted, n0 TB-level HARQ-ACK bit and n0*M CBG-level HARQ-ACK bits may be used to indicate one HARQ process, wherein n0 is an integer equal to or larger than one. For example, n0=2 if there are two TBs in a PUSCH without spatial bundling.

In Embodiments IV, the constructions of the HARQ-ACK codebook may be the same as those in FIGS. 5-7.

Embodiments V

According to some embodiments of the present disclosure, one HARQ process may be indicated by 2-bit TB-level HARQ-ACK information. The 2-bit TB-level HARQ-ACK information may represent four states respectively, i.e., "ACK," "NACK," "discontinuous transmission (DTX)," and "other state." "Other state" may refer to any state other than "ACK," "NACK," "DTX," or may be left unused. For example, "00" may indicate "ACK," "11" may indicate "NACK," "01" may indicate "DTX," and "10" may indicate "other state." However, persons skilled in the art can understand that the above examples are only for illustrative purpose, and other mapping methods taught or suggested in the present disclosure can also be applicable.

In the part of embodiments I, "NACK" are combined with "DTX" so that some HARQ processes that are not used or not transmitted by a UE 101 due to LBT failure may be indicated by CBG-level HARQ-ACK. However, according to embodiments V of the present disclosure, the state of "DTX" and "NACK" are different. Only the transmitted but failed to be decoded HARQ processes can be indicated by CBG-level HARQ-ACK information bits.

All the HARQ processes may be firstly indicated by 2-bit TB-level HARQ-ACK information in the first sub-codebook, and then the first x HARQ processes indicated by "NACK" in the first sub-codebook may be indicated by CBG-level HARQ-ACK information bits in the second sub-codebook. In this case, the first set of HARQ processes may include all the HARQ processes and the second set of HARQ processes may include first x HARQ processes indicated by "NACK" in the first sub-codebook. In an embodiment of the present disclosure, x is the largest value satisfying the following equation:

$$2*N+x*M+Z<=Y \tag{12}$$

wherein M is the maximum number of CBGs per TB, N is a number of all the HARQ processes, Z is the size of other information bits except for the HARQ-ACK codebook in the first DCI, and Y is the size of the second DCI. The other information may include at least one of the followings: CIF, AUL DFI flag to differentiate from DCI for AUL activation/deactivation, TPC for PUSCH, TPMI, and so on. That is, the first sub-codebook may include 2*N bits and the second sub-codebook may include x*M bits.

The HARQ-ACK codebook and the other information may be included in the first DCI. Specifically, in the case that the size of the first DCI is equal to the size of the second DCI, i.e., 2*N+x*M+Z=Y, no padding bit is needed for the first DCI. One or more padding bits may be needed if the size of the first DCI is smaller than the size of the second DCI, i.e., 2*N+x*M+Z<Y, then Y−(2*N+x*M+Z) padding bits may be needed for the first DCI so that the first DCI may have the same size as the second DCI. "NACK" bit may be used as the padding bit and appended in the HARQ-ACK codebook. Alternatively, zero bit may be used as the padding bit and appended in the first DCI.

In another embodiment of the present disclosure, the value of the x may be configured via RRC signaling. Similarly, one or more padding bits may be needed if the size of the first DCI is smaller than the size of the second DCI.

Similar to the part of embodiments I, the first DCI may use the first CRC (e.g., 16-bit CRC) with a bit length different from the second CRC (e.g., 24-bit CRC) used for the second DCI. In this case, the size of the first DCI and the second DCI may also include the corresponding CRC bits besides the information bits as indicated in the part of embodiments I.

In yet another embodiment of the present disclosure, spatial bundling may be configured via RRC signaling. Alternatively, spatial bundling may be adopted implicitly in the case that the HARQ-ACK codebook size in first DCI is larger than a predefined value or the payload size of the second DCI. In the case that the spatial bundling is configured or implicitly adopted, each HARQ process may be indicated with two TB-level HARQ-ACK information bits even the HARQ process is associated with an uplink data channel carrying more than one TB. In the case that spatial bundling is not configured or not implicitly adopted, each HARQ process may be indicated with four TB-level HARQ-ACK information bits when the HARQ process is associated with one uplink channel carrying one or two TBs. Accordingly, equation (12) may be changed to read the following:

$$2*2*N+2*x*M+Z<=Y \tag{13}$$

In Embodiments V, the constructions of the HARQ-ACK codebook may be the same as those in FIGS. 3-4.

Embodiments VI

According to some embodiments of the present disclosure, one HARQ process may be indicated by tri-state TB-level HARQ-ACK information. In other words, three states may be used to indicate one HARQ process. The three states may be "ACK," "NACK," and "DTX." All the HARQ processes may be firstly indicated by tri-state TB-level HARQ-ACK information in the first sub-codebook, and then the first x HARQ processes indicated by "NACK" in the first sub-codebook may be indicated by CBG-level HARQ-ACK information bits in the second sub-codebook. A decimal feedback value can be generated from the tri-state value for each HARQ process as follows: $\Sigma_{t=0}^{N-1} h(t)*3^t$, where h(t) is a numeric value representing one of the three states (e.g.

0="ACK," 1="NACK," 2="DTX") and N is the number of all the HARQ processes. The decimal value can then be converted to a binary representation.

The first set of HARQ processes may include all the HARQ processes and the second set of HARQ processes may include first x HARQ processes indicated by "NACK" in the first sub-codebook. In an embodiment of the present disclosure, x is the largest value satisfying the following equation:

$$T+x*M+Z<=Y \quad (14)$$

wherein T is total bits for indicating the tri-state TB-level feedback for all the HARQ process and can be calculated as follows:

$$T=\mathrm{ceil}\{\log 2(3^\wedge N)\} \quad (15)$$

Wherein M is the maximum number of CBGs per TB, N is a number of all the HARQ processes, Z is the size of other information bits except for the HARQ-ACK codebook in the first DCI, and Y is the size of the second DCI. The other information may include at least one of the followings: CIF, AUL DFI flag to differentiate from DCI for AUL activation/deactivation, TPC for PUSCH, TPMI, and so on.

The HARQ-ACK codebook and the other information may be included in the first DCI. One or more padding bits may be needed if the size of the first DCI is smaller than the size of the second DCI. In the case that the size of the first DCI is equal to the size of the second DCI, i.e., T+x*M+Z=Y, no padding bit is needed for the first DCI. In the case that the size of the first DCI is smaller than the size of the second DCI, i.e., T+x*M+Z<Y, then Y−(T+x*M+Z) padding bits may be needed for the first DCI so that the first DCI may have the same size as the second DCI. "NACK" bit may be used as the padding bit and appended in the HARQ-ACK codebook. Alternatively, zero bit may be used as the padding bit and appended in the first DCI.

In another embodiment of the present disclosure, the value of the x may be configured via RRC signaling. Similarly, one or more padding bits may be needed if the size of the first DCI is smaller than the size of the second DCI.

Similar to part of embodiments I, it is noted that the first DCI may use the first CRC (e.g., 16-bit CRC) with different bit length from the second CRC (e.g., 24-bit CRC) used for the second DCI. In this case, the size of the first DCI and the second DCI may also include the corresponding CRC bits besides the information bits as indicated in embodiment 1.

In yet another embodiment of the present disclosure, spatial bundling may be configured via RRC signaling. Alternatively, spatial bundling may be adopted implicitly in the case the HARQ-ACK codebook size in first DCI is larger than a predefined value or the payload size of the second DCI. In the case that the spatial bundling is configured or implicitly adopted, each HARQ process may be indicated with one TB-level HARQ-ACK information bit even the HARQ process is associated with an uplink data channel carrying more than one TB. In the case that spatial bundling is not configured or not implicitly adopted, each HARQ process may be indicated with two TB-level HARQ-ACK information bits when the HARQ process is associated with one uplink channel carrying one or two TBs. Accordingly, equation (15) may be changed to read the following:

$$2*T+2*x*M+Z<=Y \quad (16)$$

In Embodiments VI, the constructions of the HARQ-ACK codebook may be the same as those in FIGS. 3-4.

Embodiments VII

According to some embodiments of the present disclosure, one HARQ process may be indicated by 2-bit TB-level HARQ-ACK information. The 2-bit TB-level HARQ-ACK information may represent four states indicating "All ACK," "All NACK," "Partial ACK" or "Partial NACK," and "DTX," respectively. For example, "00" may indicate "All ACK," "11" may indicate "All NACK," "01" may indicate "Partial ACK" or "Partial NACK," and "10" may indicate "DTX." Persons skilled in the art can understand that the above examples are only for illustrative purpose, and other mapping methods taught or suggested in the present disclosure can also be applicable.

"All ACK" means that all the CBGs of the TB are successfully decoded, so the corresponding CBGs of the TB are not needed to be retransmitted. Additional transmission of CBG-level HARQ-ACK information bits is not needed for the TB. "All NACK" means that none of all the CBGs of the TB is successfully decoded, so all the CBGs of the TB are needed to be retransmitted. Accordingly, additional transmission of the CBG-level HARQ-ACK information bits is not needed for the TB. "Partial ACK" means that at least one CBG of the TB is successfully decoded and at least one CBG of the TB is not successfully decoded. Accordingly, CBG-level HARQ-ACK information bits are needed for the TB, and the "ACK" CBGs are not needed to be retransmitted. "Partial NACK" means that at least one CBG of the TB is not successfully decoded and at least one CBG of the TB is successfully decoded. Accordingly, CBG-level HARQ-ACK information bits are needed for the TB, and the "ACK" CBGs are not needed to be retransmitted. Therefore, "Partial ACK" and "Partial NACK" have the same meaning and can share the same bit value.

All the HARQ processes may be firstly indicated by 2-bit TB-level HARQ-ACK information in the first sub-codebook, and the first x HARQ processes indicated by "Partial NACK" or "Partial ACK" in the first sub-codebook may be indicated by CBG-level HARQ-ACK information bits in the second sub-codebook. In this case, the first set of HARQ processes may include all the HARQ processes and the second set of HARQ processes may include first x HARQ processes indicated by "Partial NACK" or "Partial ACK" in the first sub-codebook. In an embodiment of the present disclosure, x is the largest value satisfying the following equation:

$$2*N+x*M+Z<=Y \quad (17)$$

wherein M is the maximum number of CBGs per TB, N is a number of all the HARQ processes, Z is the size of other information bits except for the HARQ-ACK codebook in the first DCI, and Y is the size of the second DCI. The other information may include at least one of the followings: CIF, AUL DFI flag to differentiate from DCI for AUL activation/deactivation, TPC for PUSCH, TPMI, and so on. That is, the first sub-codebook may include 2*N bits and the second sub-codebook may include x*M bits.

The HARQ-ACK codebook and the other information may be included in the first DCI. One or more padding bits may be needed if the size of the first DCI is smaller than the size of the second DCI. In the case that the size of the first DCI is equal to the size of the second DCI, i.e., 2*N+x*M+Z=Y, no padding bit is needed for the first DCI. In the case that the size of the first DCI is smaller than the size of the second DCI, i.e., 2*N+x*M+Z<Y, then Y−(2*N+x*M+Z) padding bits may be needed for the first DCI so that the first DCI may have the same size as the second DCI. "NACK" bit may be used as the padding bit and appended in the HARQ-ACK codebook. Alternatively, zero bit may be used as the padding bit and appended in the first DCI.

In another embodiment of the present disclosure, the value of the x may be configured via RRC signaling. Similarly, one or more padding bits may be needed if the size of the first DCI is smaller than the size of the second DCI.

Similar to embodiments I, the first DCI may use the first CRC (e.g., 16-bit CRC) with a bit length different from the second CRC (e.g., 24-bit CRC) used for the second DCI. In this case, the size of the first DCI and the second DCI may also include the corresponding CRC bits besides the information bits as indicated in embodiments I.

In yet another embodiment of the present disclosure, spatial bundling may be configured by RRC signaling. Alternatively, spatial bundling may be adopted implicitly in the case the HARQ-ACK codebook size in first DCI is larger than a predefined value or the payload size of the second DCI. In the case that the spatial bundling is configured or implicitly adopted, each HARQ process may be indicated with two TB-level HARQ-ACK information bits even the HARQ process is associated with an uplink data channel carrying more than one TB. In the case that spatial bundling is not configured or not implicitly adopted, each HARQ process may be indicated with four TB-level HARQ-ACK information bits when the HARQ process is associated with one uplink channel carrying one or two TBs. Accordingly, equation (17) may be changed to read the following:

$$2*2*N+2*x*M+Z<=Y \tag{18}$$

In Embodiments VII, the constructions of the HARQ-ACK codebook may be the same as those in FIGS. 3-4.

Embodiments VIII

According to some embodiments of the present disclosure, the at least one configured uplink data channel of the plurality of uplink data channels may carry UCI and the UCI may include uplink transmission indicator (UTI). The UTI may be used for indicating the actually transmitted uplink data channel such that a BS 102 may determine the un-transmitted or the missed configured uplink data channel. For the un-transmitted or the missed configured uplink data channel, a BS 102 may not transmit CBG-level HARQ-ACK information for the corresponding HARQ process, thereby reducing the size of the HARQ-ACK codebook.

In an illustrated example, two bits can be used to indicate the value of the UTI, which can be 1, 2, 3, 4 or 0, 1, 2, 3. For example, "00" may indicate that the value of UTI is 1, "01" may indicate that the value of UTI is 2, "01" may indicate that the value of UTI is 1, "10" may indicate that the value of UTI is 3, and "11" may indicate that the value of UTI is 4. Persons skilled in the art can understand that the above examples are only used for illustrative purpose only. In some embodiments of the present disclosure, other numbers of bits for representing the UTI and other values of UTI taught or suggested in the present disclosure can also be applicable.

In an embodiment of the present disclosure, the UCI may denote an accumulative number of transmitted configured uplink data channels up to the current configured grant transmission occasion. The current configured grant transmission occasion means the time occasion when a configured grant PUSCH is transmitted. The value will be reset to the minimum value in the case it is larger than the maximum value. For example, the value of UCI in the first transmitted configured uplink data channel to the fourth transmitted configured uplink data channel may be 1, 2, 3, 4, respectively, and for the fifth transmitted configured uplink data channel, the value of UTI is reset to be 1.

A BS 102 may determine the un-transmitted configured uplink data channel or the missed configured uplink data channel based on the value of the UCI. For example, the BS 102 may configure a plurality of uplink data channels for a UE 101 including the first uplink data channel, the second uplink data channel, the third uplink data channel . . . , and so on. The UE 101 may not transmit the second uplink data channel due to the LBT failure. In this case, the value in the first uplink data channel may be 1, and the value in the third uplink data channel may be 3. After receiving the uplink data channels, the BS 102 may determine that the second uplink data channel being missed, and may not transmit CBG-level HARQ-ACK information bits for the corresponding HARQ process associated with the second uplink data channel.

In another embodiment of the present disclosure, the UCI may denote an accumulative number of transmitted uplink data channels including at least one configured grant uplink data channel and at least one scheduled uplink data channel, up to the current configured grant transmission occasion. For example, the first and the third uplink data channels may be configured by the BS 102 and the second uplink data channel may be scheduled by the BS 102. The value of UCI in the first transmitted configured uplink data channel may be 1 and the value of UCI in the third transmitted configured uplink data channel may be 3.

In another embodiment of the present disclosure, an uplink transmission indicator may denote the total number of the transmitted configured uplink data channels. In yet another embodiment of the present disclosure, the uplink transmission indicator may denote the total number of transmitted uplink data channels including configured uplink data channel and scheduled uplink data channel.

In an embodiment of the present disclosure, for the actually transmitted uplink data channels, the HARQ processes associated with actually transmitted uplink data channels are all indicated by CBG-level HARQ-ACK information bits. In another embodiment of the present disclosure, aforementioned embodiments I-VII are used to reduce the HARQ-ACK codebook size in the case that the size of first DCI is larger than the size of the second DCI.

After receiving a HARQ-ACK codebook, the UE 101 may also retransmit the at least one of the followings: at least one TB indicated by "NACK" in the first sub-codebook; and at least one CBG of a TB indicated by "NACK" in the second sub-codebook.

Figure 8:
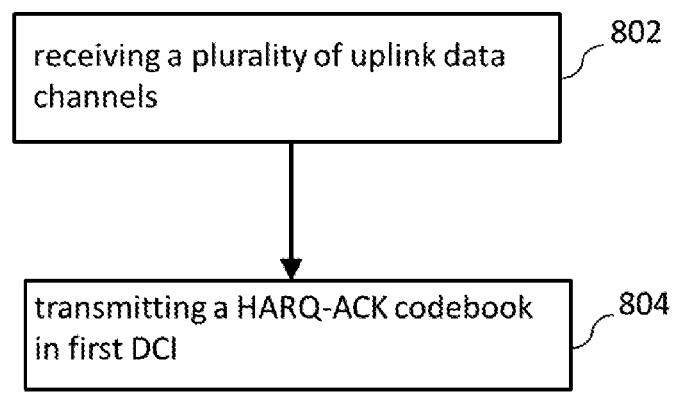
FIG. 8 is a flow chart illustrating a method for HARQ-ACK codebook reduction according to another embodiment of the present disclosure.

FIG. 8 is a flow chart illustrating a method for HARQ-ACK codebook reduction according to another embodiment of the present disclosure. The method may be implemented by a BS 102, for example, the first BS 102a or the second BS 102b as shown in FIG. 1.

As shown in FIG. 8, in step 802, the BS 102 may receive a plurality of uplink data channels from a UE 101. The uplink data channel may be a PUSCH. One or two TBs can be transmitted on each uplink data channel, and each of the plurality of uplink data channels can be associated with each HARQ process. The plurality of uplink data channels may include at least one uplink data channel configured by the BS 102, for example, via a radio resource control (RRC) signaling. In an embodiment of the present disclosure, all of the plurality of uplink data channels may be configured by the BS 102. In another embodiment of the present disclosure, the plurality of uplink data channels may include at least one uplink data channel scheduled by the BS 102, for example, via DCI. For the at least one configured uplink data channel, DCI is needed for activation and deactivation of the transmission on the at least one configured uplink data channel.

After receiving the plurality of uplink data channels, in step 204, the BS 102 may transmit a HARQ-ACK codebook in first DCI indicating downlink feedback. The HARQ-ACK codebook may include at least two sub-codebooks: the first sub-codebook including TB-level HARQ-ACK information bits for the first set of HARQ processes and the second sub-codebook including CBG-level HARQ-ACK information bits for the second set of HARQ processes. The first DCI has the same size as the second DCI for scheduling uplink data transmission of the UE 101. The size of the second DCI may refer to the payload size of the second DCI. For example, the second DCI may be a DCI format 0_0 and DCI format_1 defined in NR Rel-15. The first DCI and the second DCI may be scrambled with two different radio network temporary identities (RNTIs).

The information bits included in the HARQ-ACK codebook and the constructions of the HARQ HARQ-ACK have been illustrated in above Embodiments I-VIII.

After transmitting the HARQ-ACK codebook, the BS 102 may receive at least one of the followings: at least one TB indicated by "NACK" in the first sub-codebook; and at least one CBG of a TB indicated by "NACK" in the second sub-codebook.

Figure 9:
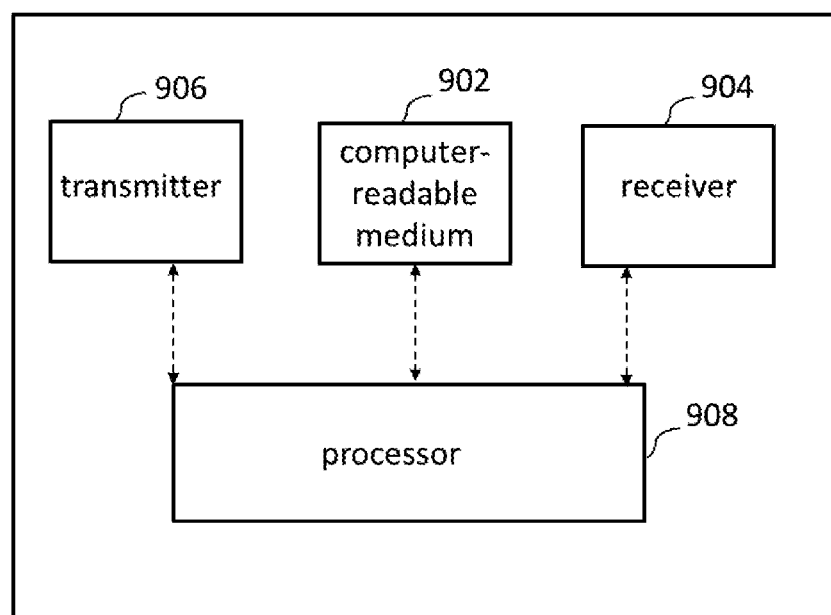
FIG. 9 illustrates a block diagram of an apparatus for HARQ-ACK codebook reduction according to an embodiment of the present disclosure.

FIG. 9 illustrates a block diagram of an apparatus 900 for HARQ-ACK codebook reduction according to an embodiment of the present disclosure. The apparatus 900 may be a UE 101, for example, the first UE 101a or the second UE 101b.

Referring to FIG. 9, the apparatus 900 may include at least one non-transitory computer-readable medium 902, at least one receiver 904, at least one transmitter 906, and at least one processor 908. In some embodiment of the present disclosure, at least one receiver 904 and at least one transmitter 906 and be integrated into at least one transceiver. The at least one non-transitory computer-readable medium 902 may have computer executable instructions stored therein. The at least one processor 908 may be coupled to the at least one non-transitory computer-readable medium 902, the at least one receiver 904 and the at least one transmitter 906. The computer executable instructions can be programmed to implement a method with the at least one receiver 904, the at least one transmitter 906 and the at least one processor 908. The method can be a method according to an embodiment of the present disclosure, for example, the method shown in FIG. 2.

Figure 10:
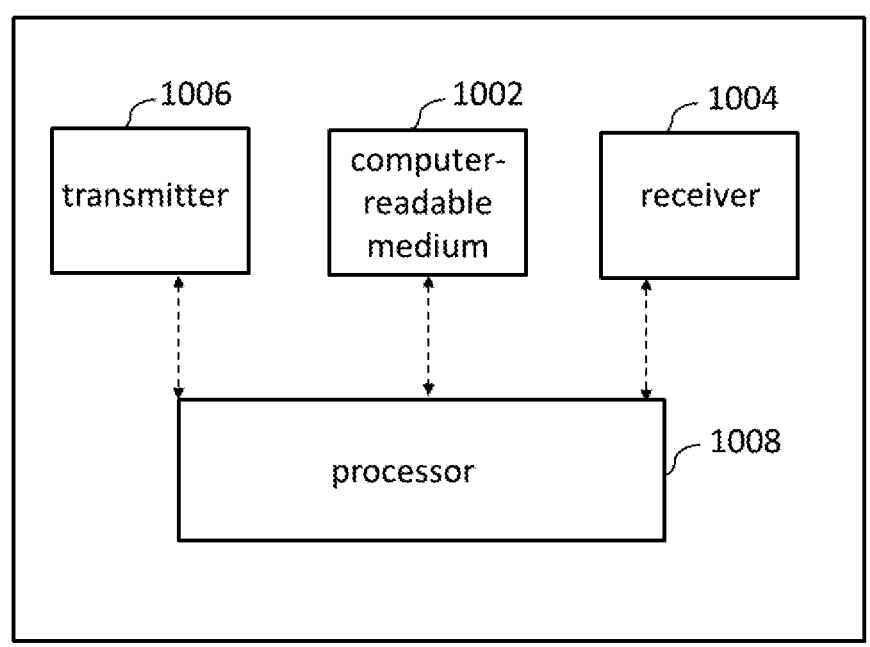
FIG. 10 illustrates a block diagram of an apparatus for HARQ-ACK codebook reduction according to another embodiment of the present disclosure.

FIG. 10 illustrates a block diagram of an apparatus 1000 for HARQ-ACK codebook reduction according to another embodiment of the present disclosure. The apparatus 1000 may be a BS 102, for example, the first BS 102a or the second BS 102b.

Referring to FIG. 10, the apparatus 1000 may include at least one non-transitory computer-readable medium 1002, at least one receiver 1004, at least one transmitter 1006, and at least one processor 1008. In some embodiments of the present disclosure, at least one receiver 904 and at least one transmitter 906 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiver 1004 and the at least one transmitter 1006. The computer executable instructions can be programmed to implement a method with the at least one receiver 1002, the at least one transmitter 1004 and the at least one processor 1006. The method can be a method according to an embodiment of the present application, for example, the method shown in FIG. 8.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method comprising:
   transmitting a plurality of uplink data channels to a base station, wherein at least one uplink data channel of the plurality of uplink data channels is configured by the base station, and wherein each of the plurality of uplink data channels is associated with a hybrid automatic repeat request process; and
   receiving a hybrid automatic repeat request acknowledgement codebook in first downlink control information indicating downlink feedback, wherein the hybrid automatic repeat request acknowledgement codebook comprises at least two sub-codebooks:
a first sub-codebook comprising transport block level hybrid automatic repeat request acknowledgement information bits for a first set of hybrid automatic repeat request processes, and
a second sub-codebook comprising code block group level hybrid automatic repeat request acknowledgement information bits for a second set of hybrid automatic repeat request processes; and
wherein the first downlink control information has a same size with second downlink control information for scheduling uplink data transmission.

2. The method of claim 1, wherein the first set of hybrid automatic repeat request processes includes all the hybrid automatic repeat request processes and the second set of hybrid automatic repeat request processes includes first x hybrid automatic repeat request processes indicated by "non-acknowledgement (NACK)" in the first sub-codebook and x is the largest value satisfying the following equation:

$$N+x*M+Z<=Y,$$

wherein M is the maximum number of code block groups per transport block, N is a number of all the hybrid automatic repeat request processes, Z is a size of other information bits except for the hybrid automatic repeat request acknowledgement codebook in the first downlink control information, and Y is the size of the second downlink control information.

3. The method of claim 1, wherein the first set of hybrid automatic repeat request processes include (N−x) hybrid automatic repeat request processes and the second set of hybrid automatic repeat request processes includes x hybrid automatic repeat request processes, and x is the largest value satisfying the following equation:

$$x*M+(N-x)+Z<=Y,$$

wherein M is the maximum number of code block groups per transport block, N is a number of all the hybrid automatic repeat request processes, Z is a size of other information bits except for hybrid automatic repeat request acknowledgement codebook in the first downlink control information, and Y is the size of the second downlink control information.

4. The method of claim 1, wherein the first set of hybrid automatic repeat request processes includes all the hybrid automatic repeat request processes and the second set of hybrid automatic repeat request processes includes first x hybrid automatic repeat request processes indicated by "NACK" in the first sub-codebook, and x is configured by a radio resource control signaling.

5. The method of claim 1, wherein the first set of hybrid automatic repeat request processes includes (N−x) hybrid automatic repeat request processes and the second set of hybrid automatic repeat request processes includes x hybrid automatic repeat request processes, wherein N is a number of all the hybrid automatic repeat request processes and x is a value configured by a radio resource control signaling.

6. The method of claim 1, wherein each of the first set of hybrid automatic repeat request processes is indicated with two transport block level hybrid automatic repeat request acknowledgement information bits in the first sub-codebook.

7. The method of claim 6, wherein the two transport block level hybrid automatic repeat request acknowledgement information bits represent four states indicating "acknowledgement (ACK)," "NACK," "discontinuous transmission (DTX)," and "other state" respectively; wherein the first set of hybrid automatic repeat request processes includes all the hybrid automatic repeat request processes and the second set of hybrid automatic repeat request processes includes first x hybrid automatic repeat request processes indicated by "NACK" in the first sub-codebook, and x is the largest value satisfying the following equation:

$$2*N+x*M+Z<=Y,$$

wherein M is the maximum number of code block groups per transport block, N is a number of all the hybrid automatic repeat request processes, Z is a size of other information bits except for the hybrid automatic repeat request acknowledgement codebook in the first downlink control information, and Y is the size of the second downlink control information.

8. The method of claim 6, wherein the two transport block level hybrid automatic repeat request acknowledgement information bits represent four states indicating "All ACK," "All NACK," "Partial ACK" or "Partial NACK," "DTX" for all code block groups of each transport block on each of the first set of hybrid automatic repeat request processes; wherein the first set of hybrid automatic repeat request processes includes all the hybrid automatic repeat request processes, and the second set of hybrid automatic repeat request processes includes first x hybrid automatic repeat request processes indicated by "Partial ACK" or "Partial NACK" in the first sub-codebook, and x is the largest value satisfying the following equation:

$$2*N+x*M+Z<=Y,$$

wherein M is the maximum number of code block groups per transport block, N is a number of all the hybrid automatic repeat request processes, Z is a size of other information bits except for the hybrid automatic repeat request acknowledgement codebook in the first downlink control information, and Y is the size of the second downlink control information.

9. The method of claim 1, wherein the first sub-codebook comprises T bits for the first set of hybrid automatic repeat request processes and the first set of hybrid automatic repeat request processes comprises all the hybrid automatic repeat request processes, and the second set of hybrid automatic repeat request processes comprises first x hybrid automatic repeat request processes indicated by "NACK" in the first sub-codebook, and x is the largest value satisfying the following equation:

$$T+x*M+Z<=Y,$$

wherein M is the maximum number of code block groups per transport block, Z is a size of other information bits except for the hybrid automatic repeat request acknowledgement codebook in the first downlink control information, and Y is the size of the second downlink control information.

10. The method of claim 1, wherein the at least one configured uplink data channel of the plurality of uplink data channels carries uplink control information and the uplink control information includes uplink transmission indicator.

11. The method of claim 10, wherein the uplink transmission indicator denotes an accumulative number of transmitted configured uplink data channels up to the current configured grant transmission occasion.

12. The method of claim 10, wherein the uplink transmission indicator denotes an accumulative number of transmitted uplink data channels including configured grant uplink data channel and scheduled uplink data channel, up to the current configured grant transmission occasion.

13. The method of claim 10, wherein the uplink transmission indicator denotes a total number of transmitted configured uplink data channels.

14. The method of claim 10, wherein the uplink transmission indicator denotes a total number of transmitted uplink data channels including configured grant uplink data channel and scheduled uplink data channel.

15. The method of claim 1, wherein the second set of hybrid automatic repeat request processes includes a third set of hybrid automatic repeat request processes which are transmitted in reference slots and indicated by "NACK" in the first sub-codebook, wherein the reference slots are used for determining a contention window size for uplink channel access procedure.

16. The method of claim 1, wherein the first downlink control information further includes padding bits so as to have a same size with the second downlink control information.

17. A method comprising:
   receiving, from a device, a plurality of uplink data channels, wherein at least one uplink data channel of the plurality of uplink data channels is configured to the device, and wherein each of the plurality of uplink data channels is associated with a hybrid automatic repeat request process; and
   transmitting, to the device, a hybrid automatic repeat request acknowledgement codebook in first downlink control information indicating downlink feedback, wherein the hybrid automatic repeat request acknowledgement codebook comprises at least two sub-codebooks:
   a first sub-codebook comprising transport block level hybrid automatic repeat request acknowledgement information bits for a first set of hybrid automatic repeat request processes, and
   a second sub-codebook comprising code block group level hybrid automatic repeat request acknowledgement information bits for a second set of hybrid automatic repeat request processes; and
   wherein the first downlink control information has a same size with second downlink control information scheduling uplink data transmission.

18. The method of claim 17, wherein the at least one configured uplink data channel of the plurality of uplink data channels carries uplink control information and the uplink control information includes uplink transmission indicator.

19. The method of claim 17, wherein the second set of hybrid automatic repeat request processes includes a third set of hybrid automatic repeat request processes which are transmitted in reference slots and indicated by "NACK" in the first sub-codebook, wherein the reference slots are used for determining a contention window size for uplink channel access procedure.

20. The method of claim 17, wherein the first downlink control information further includes padding bits so as to have a same size with the second downlink control information.

* * * * *